(12) United States Patent
Go et al.

(10) Patent No.: US 12,060,996 B2
(45) Date of Patent: Aug. 13, 2024

(54) MICROMIXER AND COMBUSTOR HAVING THE SAME

(71) Applicant: DOOSAN ENERBILITY CO., LTD, Changwon-si (KR)

(72) Inventors: Young Gun Go, Yongin (KR); Hyun Soo An, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 196 days.

(21) Appl. No.: 17/542,391

(22) Filed: Dec. 4, 2021

(65) Prior Publication Data
US 2022/0243917 A1   Aug. 4, 2022

(30) Foreign Application Priority Data

Jan. 27, 2021   (KR) .......................... 10-2021-0011664

(51) Int. Cl.
*F23R 3/28*   (2006.01)
*F02C 7/22*   (2006.01)

(52) U.S. Cl.
CPC ................ *F23R 3/286* (2013.01); *F02C 7/22* (2013.01); *F05D 2220/32* (2013.01); *F05D 2240/35* (2013.01)

(58) Field of Classification Search
CPC ................ F23R 3/286; F23R 3/34–346; F23R 2900/00014; F23D 14/82; F23D 2209/10; F23D 14/62–70; F23D 2900/31019; F23D 11/40; F23D 14/22; F23D 14/02; F23D 2203/007; F23N 2231/28

(Continued)

(56) References Cited

U.S. PATENT DOCUMENTS

2011/0197587 A1* 8/2011 Zuo .................. F23D 14/02
                                                                239/398
2014/0190169 A1   7/2014 Melton
(Continued)

FOREIGN PATENT DOCUMENTS

EP   2642207 A2   3/2013
EP   2667099 A2   5/2013
(Continued)

OTHER PUBLICATIONS

KR Decision to Grant, dated Jun. 21, 2022.

*Primary Examiner* — Stephanie Sebasco Cheng
*Assistant Examiner* — Jingchen Liu
(74) *Attorney, Agent, or Firm* — Harvest IP Law, LLP

(57) ABSTRACT

A micromixer configured to prevent auto-ignition and flashback phenomena, and a combustor including the same are provided. The micromixer includes an inlet flow path configured including an inlet formed on one end and receiving a first fluid and a supply port formed on an inner wall and receiving a second fluid, and the inlet flow path is configured to flow a mixed fluid formed by mixing the first fluid and the second fluid, an outlet flow path injecting the mixed fluid to a combustion chamber and formed at a position spaced apart from a virtual extension line of the inlet flow path, and an inclined flow path connecting the inlet flow path and the outlet flow path and formed to be inclined at a predetermined angle to reduce transfer of radiant heat by flame generated in the combustion chamber to the inlet flow path.

6 Claims, 7 Drawing Sheets

(58) Field of Classification Search
USPC .................................................. 431/181, 217
See application file for complete search history.

(56) References Cited

U.S. PATENT DOCUMENTS

| | | |
|---|---|---|
| 2016/0033133 A1 | 2/2016 | Johnson |
| 2017/0268780 A1* | 9/2017 | Purcell .................... F23R 3/286 |
| 2017/0284677 A1* | 10/2017 | Horikawa ................. F23R 3/10 |
| 2018/0372318 A1 | 12/2018 | Bolanos |
| 2019/0107284 A1* | 4/2019 | Seo ......................... F23R 3/286 |
| 2020/0284431 A1* | 9/2020 | Ishihara ................. F23D 14/62 |

FOREIGN PATENT DOCUMENTS

| | | | |
|---|---|---|---|
| EP | 2484975 | A2 | 11/2021 |
| JP | 2014105886 | A * | 6/2014 |
| JP | 2014105886 | A | 6/2014 |
| JP | 5948489 | B2 | 7/2016 |
| JP | 2017096618 | A | 6/2017 |
| KR | 100193294 | B1 | 6/1999 |
| KR | 1110144 | B1 | 2/2012 |
| KR | 20190040666 | A | 4/2019 |
| KR | 20200027894 | A | 3/2020 |
| KR | 102190537 | B1 | 12/2020 |

* cited by examiner

MICROMIXER AND COMBUSTOR HAVING THE SAME

CROSS-REFERENCE TO RELATED APPLICATION

This application claims priority to Korean Patent Application No. 10-2021-0011664, filed on Jan. 27, 2021, the disclosure of which is incorporated by reference herein in its entirety.

BACKGROUND

Field

Apparatuses and methods consistent with exemplary embodiments relate to a micromixer and a combustor having the same.

Description of the Related Art

A gas turbine is a power engine configured to mix and combust air compressed by a compressor and fuel and rotate a turbine with a high-temperature gas generated by combustion. The gas turbine is used to drive a generator, an aircraft, a ship, a train, or the like.

The gas turbine includes a compressor, a combustor, and a turbine. The compressor sucks and compresses external air and delivers the compressed air to the combustor. The air compressed by the compressor is in a high-pressure and high-temperature state. The combustor mixes the compressed air compressed by the compressor with fuel and combusts the mixture to produce combustion gas which is discharged to the turbine. A turbine blade in the turbine is rotated by the combusted gas to generate power. The generated power is used in various fields such as power generation and driving of a mechanical device.

SUMMARY

Aspects of one or more exemplary embodiments provide a micromixer and a combustor including the same, which can deliver radiant heat by flame generated in a combustion chamber to a micromixer to prevent auto-ignition and flashback phenomena occurring in the micromixer.

Additional aspects will be set forth in part in the description which follows and, in part, will become apparent from the description, or may be learned by practice of the exemplary embodiments.

According to an aspect of an exemplary embodiment, there is provided a micromixer including: an inlet flow path configured to include an inlet formed on one end and through which first fluid flows and a supply port formed on an inner wall and through which second fluid is supplied, and to flow mixed fluid formed by mixing the first fluid introduced through the inlet and the second fluid supplied through the supply port; an outlet flow path injecting the mixed fluid to a combustion chamber and formed at a position spaced apart from a virtual extension line of the inlet flow path; and an inclined flow path connecting the inlet flow path and the outlet flow path and formed to be inclined at a predetermined angle to reduce transfer of radiant heat by flame generated in the combustion chamber to the inlet flow path.

The inlet flow path can have a first cross-sectional area, the outlet flow path can have a second cross-sectional area larger than the first cross-sectional area, and the inclined flow path can have a variable cross-sectional area that gradually increases from the inlet flow path to the output flow path.

The inclined flow path can include a first line forming a first angle with a virtual extension line of the output flow path and a second line forming a second angle with the virtual extension line of the output flow path, and the first angle and the second angle can be different from each other.

The first fluid can be fuel including hydrogen, and the second fluid can be air.

The first fluid can be air and the second fluid can be fuel including hydrogen.

A supply port through which the second fluid is supplied can be additionally formed in at least a portion of the inclined flow path.

Cross-sectional areas of the inlet flow path, the inclined flow path, and the output flow path can be formed in a polygonal shape.

According to an aspect of another exemplary embodiment, there is provided a combustor including: a combustion chamber assembly including a combustion chamber in which fuel fluid is combusted; and a micromixer assembly including a plurality of micromixers to inject the fuel fluid to the combustion chamber. The micromixer includes an inlet flow path configured to include an inlet formed on one end and through which first fluid flows and a supply port formed on an inner wall and through which second fluid is supplied, and to flow mixed fluid formed by mixing the first fluid introduced through the inlet and the second fluid supplied through the supply port; an outlet flow path injecting the mixed fluid to a combustion chamber and formed at a position spaced apart from a virtual extension line of the inlet flow path; and an inclined flow path connecting the inlet flow path and the outlet flow path and formed to be inclined at a predetermined angle to reduce transfer of radiant heat by flame generated in the combustion chamber to the inlet flow path.

The inlet flow path can have a first cross-sectional area, the output flow path can have a second cross-sectional area larger than the first cross-sectional area, and the inclined flow path can have a variable cross-sectional area that gradually increases from the inlet flow path to the output flow path.

The inclined flow path can include a first line forming a first angle with a virtual extension line of the output flow path and a second line forming a second angle with the virtual extension line of the output flow path, and the first angle and the second angle can be different from each other.

The first fluid can be fuel comprising hydrogen and the second fluid can be air.

The first fluid can be air and the second fluid can be fuel including hydrogen.

A supply port through which the second fluid is supplied can be additionally formed in at least a portion of the inclined flow path.

Cross-sectional areas of the inlet flow path, the inclined flow path, and the output flow path can be formed in a polygonal shape.

According to an aspect of another exemplary embodiment, there is provided a gas turbine including: a compressor configured to compress air, a combustor configured to mix the air compressed by the compressor with fuel to combust the mixture, and a turbine configured to be rotated by the combustion gas produced by the combustor to generate power. The combustor includes a combustion chamber assembly including a combustion chamber in which fuel fluid is combusted; and a micromixer assembly including a plurality of micromixers to inject the fuel fluid to the combustion chamber. The micromixer includes an inlet flow path configured to include an inlet formed on one end and through which first fluid flows and a supply port formed on an inner wall and through which second fluid is supplied, and to flow mixed fluid formed by mixing the first fluid introduced through the inlet and the second fluid supplied through the supply port; an outlet flow path injecting the mixed fluid to a combustion chamber and formed at a position spaced apart from a virtual extension line of the inlet flow path; and an inclined flow path connecting the inlet flow path and the outlet flow path and formed to be inclined at a predetermined angle to reduce transfer of radiant heat by flame generated in the combustion chamber to the inlet flow path.

The inlet flow path can have a first cross-sectional area, the output flow path can have a second cross-sectional area larger than the first cross-sectional area, and the inclined flow path can have a variable cross-sectional area that gradually increases from the inlet flow path to the output flow path.

The inclined flow path can include a first line forming a first angle with a virtual extension line of the output flow path and a second line forming a second angle with the virtual extension line of the output flow path, and the first angle and the second angle can be different from each other.

The first fluid can be fuel including hydrogen and the second fluid can be air, or the first fluid can be air and the second fluid can be fuel including hydrogen.

A supply port through which the second fluid is supplied can be additionally formed in at least a portion of the inclined flow path.

Cross-sectional areas of the inlet flow path, the inclined flow path, and the output flow path can be formed in a polygonal shape.

According to one or more exemplary embodiments, it is possible to reduce the delivery of the radiant heat by the flame generated in the combustion chamber to the micromixer, thereby preventing the auto-ignition and flash-back phenomena occurring in the micromixer.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
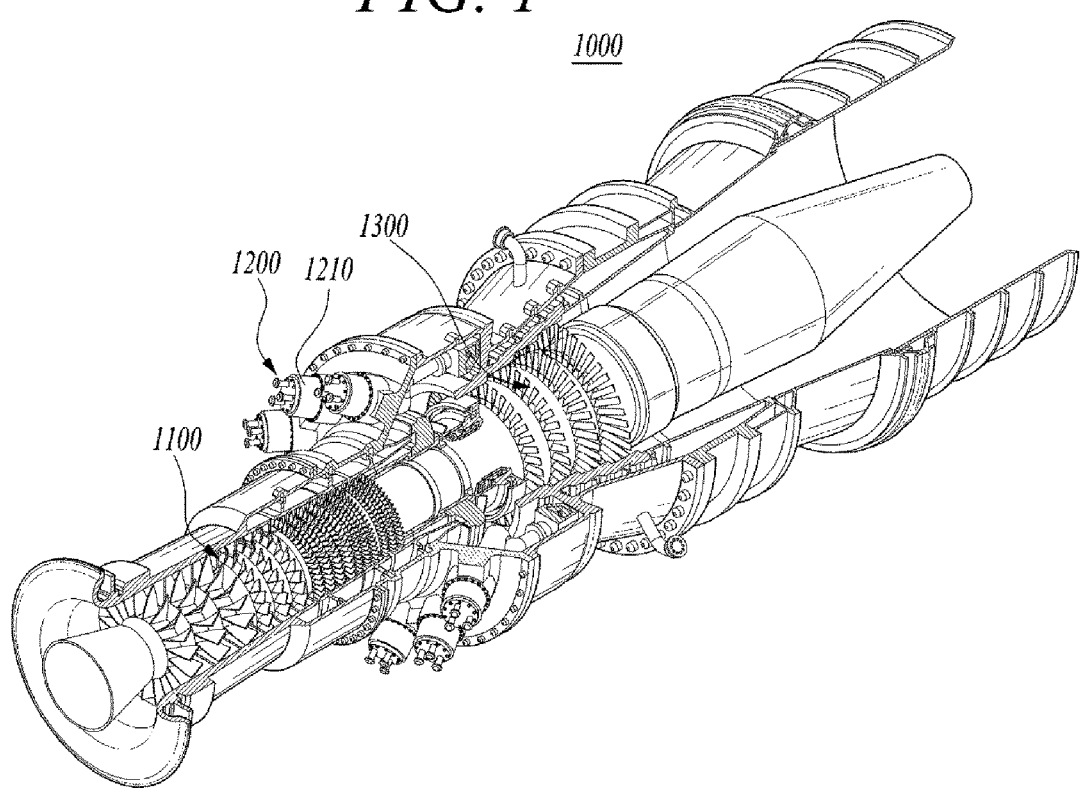
FIG. 1 is a diagram showing an interior of a gas turbine according to an exemplary embodiment.

Various changes and various embodiments will be described in detail with reference to the accompanying drawings. It should be understood, however, that the various embodiments are not for limiting the scope of the disclosure to the specific embodiment, but they should be interpreted to include all modifications, equivalents or substitutions of the embodiments included within the sprit and scope disclosed herein.

The terms used herein are used to describe only specific embodiments, and are not intended to limit the scope of the disclosure. The singular forms include the plural forms unless the context clearly indicates otherwise. In the present disclosure, it should be understood that the terms "comprises" or "includes," etc. specify the presence of features, integers, steps, operations, components, parts or a combination thereof described in the specification, but do not preclude the presence or addition possibility of one or more other features, integers, steps, operations, components, parts or a combination thereof.

Hereinafter, a micromixer and a combustor including the same according to an exemplary embodiment will be described with reference to the drawings. It is noted that like reference numerals refer to like parts throughout the various figures and exemplary embodiments. In certain embodiments, a detailed description of known functions and configurations that may obscure the gist of the present disclosure will be omitted. For the same reason, some of the elements in the drawings are exaggerated, omitted, or schematically illustrated.

Figure 2:
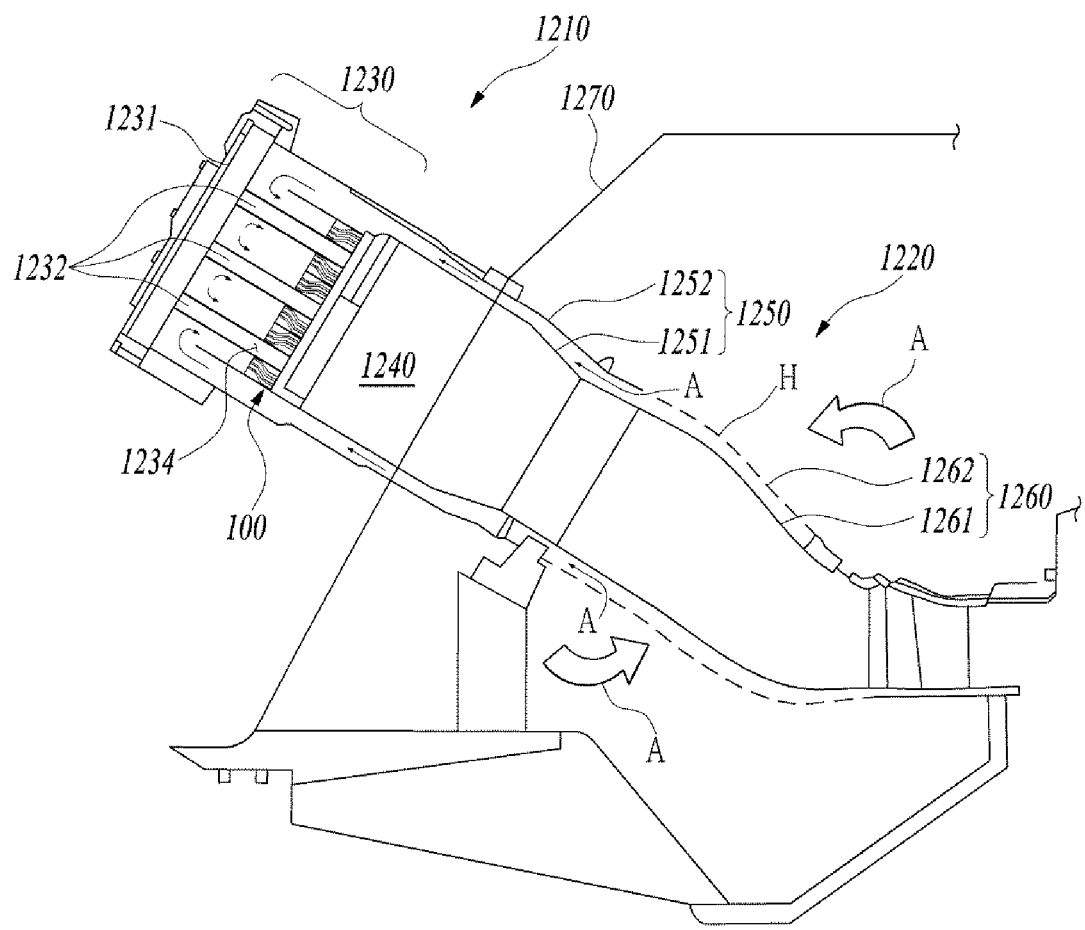
FIG. 2 is a diagram showing a burner module constituting a combustor according to an exemplary embodiment.

FIG. 1 is a diagram showing an interior of a gas turbine according to an exemplary embodiment, and FIG. 2 is a diagram showing a burner module constituting a combustor according to an exemplary embodiment.

Referring to FIGS. 1 and 2, a gas turbine 1000 includes a compressor 1100 configured to compress introduced air at high pressure, a combustor 1200 configured to mix the compressed air compressed by the compressor 1100 with fuel to combust the mixture, and a turbine 1300 configured to generate a rotation force with a combustion gas generated by the combustor 1200. Here, an upstream and a downstream are defined based on a front and rear of fuel or air flow.

A thermodynamic cycle of the gas turbine can ideally comply with a Brayton cycle. The Brayton cycle consists of four processes: isentropic compression (i.e., an insulation compression) process, static pressure rapid heat process, isentropic expansion (i.e., an insulation expansion) process, and static pressure heat dissipation process. That is, in the Brayton cycle, thermal energy may be released by combustion of fuel in the static pressure environment after ambient air is sucked and compressed at high pressure, the high-temperature combusted gas is expanded and converted into kinetic energy, and an exhaust gas with remaining energy is emitted to the atmosphere. As such, the Brayton cycle consists of four processes including compression, heating, expansion, and heat-dissipation.

The gas turbine 1000 employing the Brayton cycle includes the compressor 1100, the combustor 1200, and the turbine 1300. Although the following description will be described with reference to FIG. 1, the present disclosure may be widely applied to other turbine engines having similar configurations to the gas turbine 1000 illustrated in FIG. 1.

Referring to FIG. 1, the compressor 1100 of the gas turbine may suck and compress air to supply the air for combustion to the combustor 1200 and to supply the air for cooling to a high-temperature region of the gas turbine that is required to be cooled. Because the sucked air is compressed in the compressor 1100 through an insulation compression process, the pressure and temperature of the air passing through the compressor 1100 increases.

The compressor 1100 may be designed in a form of a centrifugal compressor or an axial compressor, and the centrifugal compressor is applied to a small gas turbine whereas a multistage axial compressor is applied to a large gas turbine illustrated in FIG. 1 to compress a large amount of air.

The compressor 1100 is driven using a part of the power output from the turbine 1300. To this end, as shown in FIG. 1, a rotary shaft of the compressor 1100 and a rotary shaft of the turbine 1300 are directly connected. In the case of the large gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The combustor 1200 mixes the compressed air supplied from an outlet of the compressor 110 with fuel to combust the mixture at constant pressure to generate a combustion gas with high energy. The combustor 1200 is disposed on the downstream of the compressor 1100 and includes a plurality of burner modules 1210 annually disposed around the rotary shaft.

Referring to FIG. 2, the burner module 1210 can include a combustion chamber assembly 1220 including a combustion chamber 1240 in which fuel fluid burns, and a micromixer assembly 1230 including a plurality of micromixers 100 that inject the fuel fluid into the combustor 1240. The fuel fluid can be supplied from a fuel tank (FT) in which fuel (e.g., hydrogen) is stored.

The gas turbine 1000 may use gas fuel including hydrogen or natural gas, liquid fuel, or a combination thereof. In order to create a combustion environment to reduce the amount of emissions such as carbon monoxide or nitrogen oxides, a gas turbine has a recent tendency to apply a premixed combustion scheme that is advantageous in reducing emissions through lowered combustion temperature and homogeneous combustion even though it is difficult to control the premixed combustion.

For the premix combustion, the compressed air introduced from the compressor 1100 is mixed with fuel in advance in the micromixer assembly 1230, and then enters the combustion chamber 1240. When a premix gas is initially ignited by an igniter and then combustion state is stabilized, the combustion state is maintained by supplying fuel and air.

The micromixer assembly 1230 includes a plurality of micromixer bundles (MB) in which a plurality of micromixers 100 configured to inject a mixed fuel fluid are disposed. The micromixer 100 mixes fuel with air in an appropriate rate to form a fuel-air mixture having conditions suitable for combustion. The plurality of micromixer bundles (MB) can have a plurality of external micromixer bundles radially disposed around the inner micromixer bundle.

The combustion chamber assembly 1220 includes the combustion chamber 1240 in which combustion occurs, a liner 1250 and a transition piece 1260.

The liner 1250 disposed on a downstream side of the micromixer assembly 1230 may have a dual structure of an inner liner 1251 and an outer liner 1252 in which the inner liner 1251 is surrounded by the outer liner 1252. In this case, the inner liner 1251 is a hollow tubular member, and an internal space of the inner liner 1251 forms the combustion chamber 1240. The inner liner 1251 is cooled by the compressed air introduced into an annular space inside the outer liner 1252 through a compressed air introduction hole (H).

The transition piece 1260 is disposed on a downstream side of the liner 1250 to guide the combustion gas generated in the combustion chamber 1240 toward the turbine 1300. The transition piece 1260 may have a dual structure of an inner transition piece 1261 and an outer transition piece 1262 in which the inner transition piece 1261 is surrounded by the outer transition piece 1262. The inner transition piece 1261 is also formed of a hollow tubular member such that a diameter gradually decreases from the liner 1250 toward the turbine 1300. In this case, the inner liner 1251 and the inner transition piece 1261 can be coupled to each other by a plate spring seal. Because respective ends of the inner liner 1251 and the inner transition piece 1261 are fixed to the combustor 1200 and the turbine 1300, respectively, the plate spring seal may have a structure capable of accommodating expansion of length and diameter by thermal expansion to support the inner liner 1251 and the inner transition piece 1261.

As such, the inner liner 1251 and the inner transition piece 1261 have a structure surrounded by the outer liner 1252 and the outer transition piece 1262, respectively, so that the compressed air may flow into the annular space between the inner liner 1251 and the outer liner 1252 and into the annular space between the inner transition piece 1261 and the outer transition piece 1262 through the compressed air introduction hole (H). The compressed air introduced into the annular space can cool the inner liner 1251 and the inner transition piece 1261.

Meanwhile, the high-temperature and high-pressure combustion gas produced by the combustor 1200 is supplied to the turbine 1300 through the liner 1250 and the transition piece 1260. As the insulation expansion of the combustion gas is made in the turbine 1300, the combustion gas collides with a plurality of blades radially disposed on the rotary shaft of the turbine 1300 so that the thermal energy of the combustion gas is converted into mechanical energy that rotates the rotary shaft. A part of the mechanical energy obtained from the turbine 1300 is supplied as energy necessary for compressing the air in the compressor 1100, and the remaining energy is used as available energy to drive a generator to produce power.

The combustor 1200 may further include a casing 1270 and an end cover 1231 coupled to accommodate the compressed air (A) flowing into the burner module 1210. After the compressed air (A) flows into the annular space in the liner 1250 or the transition piece 1260 through the compressed air introduction hole (H), a flow direction of the compressed air (A) is changed by the end cover 1231 to the inside of the micromixer 100. The fuel (F) can flow into a fuel flow path 1232 and a fuel plenum 1234 through a plenum inlet 1234a, and then flow into the micromixer 100 through a supply port 112 to be mixed with the compressed air.

Figure 3:
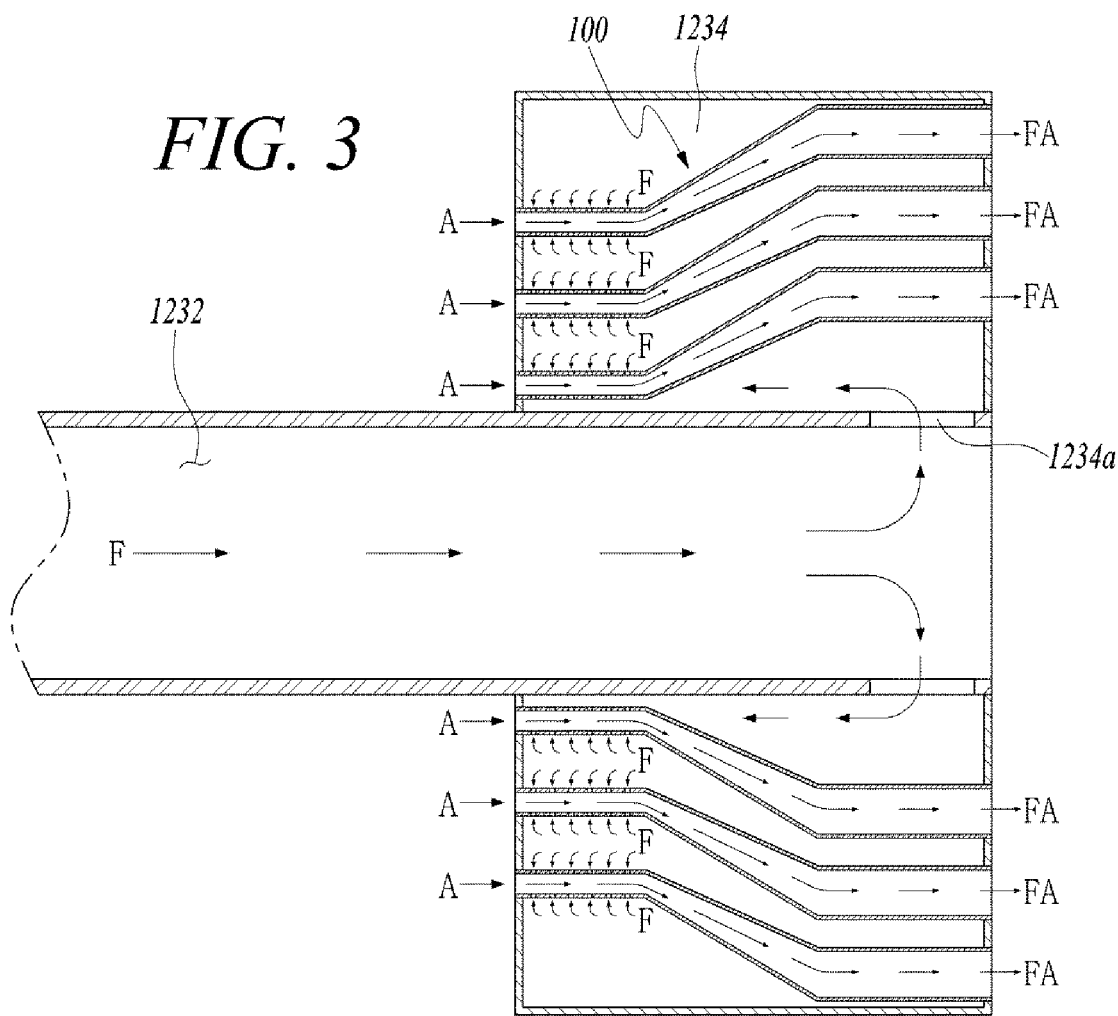
FIG. 3 is a side cross-sectional diagram showing a micromixer bundle according to an exemplary embodiment.
Figure 4:
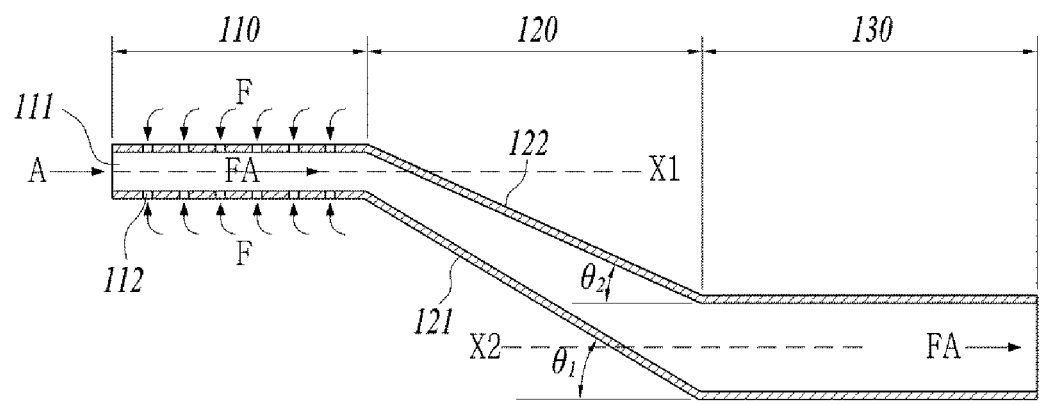
FIGS. 4 and 5 are side cross-sectional diagrams showing a micromixer according to the exemplary embodiment.
Figure 5:
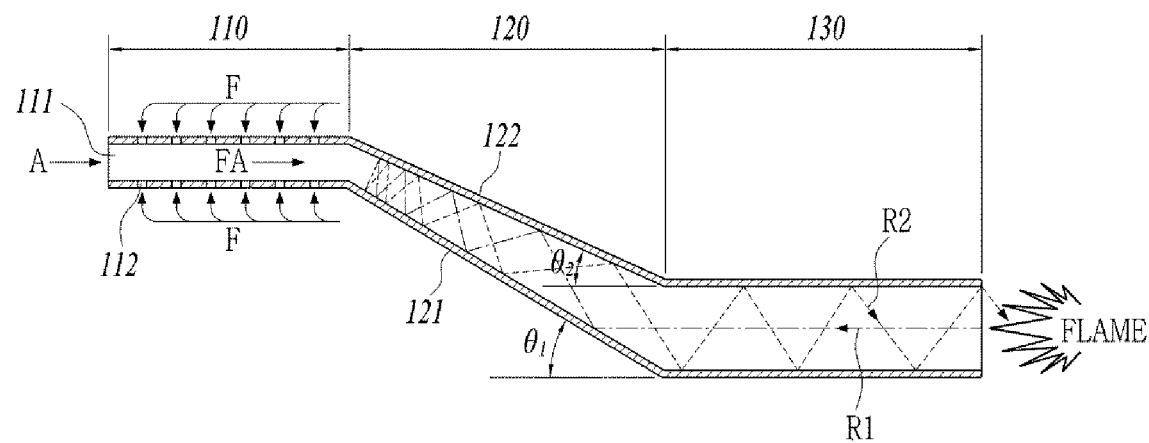

FIG. 3 is a side cross-sectional diagram showing a micromixer bundle according to an exemplary embodiment, and FIGS. 4 and 5 are side cross-sectional diagrams showing a micromixer according to an exemplary embodiment.

Referring to FIGS. 3 to 5, the micromixer bundle (MB) includes a plurality of micromixers 100 and is formed to extend in a radial direction with respect to the fuel flow path 1232. The micromixer 100 is formed to extend in the flow direction of the fluid (e.g., fuel or air).

The micromixer 100 is formed in a form of a tube in which a cross-sectional area thereof is gradually increased as a central portion is inclined as opposed to a general straight tube form, to reduce the transfer of radiant heat by the flame generated in the combustion chamber 1240 to the micromixer 100, thereby preventing auto-ignition and flash-back phenomena occurring in the micromixer 100.

The micromixer 100 includes an inlet flow path 110, an inclined flow path 120, and an outlet flow path 130.

The inlet flow path 110 includes an inlet 111 formed on one end to flow air (A), and a supply port 112 formed on an inner wall to supply fuel (F). The air (A) introduced through the inlet 111 and the fuel (F) supplied through the supply port 112 are mixed in the inlet flow path 110 to form a mixed fluid (FA) to flow into the inclined flow path 120.

The inclined flow path 120 connected to the other end of the inlet flow path 110 is inclined at a predetermined angle. The mixed fluid (FA) flows along the inclined flow path 120 and the outlet flow path 130, and then is injected into the combustion chamber 1240.

The outlet flow path 130 is formed at a position spaced apart from a virtual extension line of the inlet flow path 110. In other words, a flow axis (X1, center of the flow direction of the mixed fluid) of the mixed fluid (FA) flowing through the inlet flow path 110 and a flow axis (X2) of the mixed fluid (FA) flowing through the outlet flow path 130 do not coincide with each other by the inclined flow path 120 and are spaced apart from each other in a predetermined distance and arranged in parallel. The virtual extension line can be the flow axis of the mixed fluid (FA).

The inclined flow path 120 connects the inlet flow path 110 and the outlet flow path 130 and is inclined at a predetermined angle. The inclined flow path 120 connects the inlet flow path 110 and the outlet flow path 130 spaced apart from each other by a predetermined distance and is formed in a form of a tube in which the cross-sectional area gradually increases from the inlet flow path 110 to the outlet flow path 130.

As a result, the cross-sectional area of the inlet flow path 110 can be formed to be the smallest, and the cross-sectional area of the outlet flow path 130 can be formed to be the largest. In other words, the inlet flow path 110 can have a first cross-sectional area, the outlet flow path 130 can have a second cross-sectional area larger than the first cross-sectional area, and the inclined flow path 120 can have a variable cross-sectional area that is gradually increased from the inlet flow path 110 toward the outlet flow path 130.

Further, the inclined flow path 120 includes a first line 121 at a lower portion and a second line 122 at an upper portion. The first line 121 forms a first angle (θ1) with the virtual extension line (X2) of the outlet flow path 130, and the second line 122 forms a second angle (θ2) with the virtual extension line (X2) of the outlet flow path 130. Because the inclined flow path 120 has a variable cross-sectional area, the first angle (θ1) and the second angle (θ2) can be formed at different angles.

As shown in FIG. 4, if the inclined flow path 120 is formed to be inclined downward, the first angle (θ1) can be formed to be larger than the second angle (θ2). Alternatively, as in the micromixer 100 formed in the upper fuel plenum 1234 of FIG. 3, if the inclined flow path 120 is formed to be inclined upward, the second angle (θ2) can be formed to be larger than the first angle (θ1).

The cross-sectional areas of the inlet flow path 110, the inclined flow path 120, and the outlet flow path 130 can be formed in a polygonal shape.

Referring to FIG. 5, radiant heat (R1) transferred to the micromixer 100 through the outlet flow path 130 among the radiant heat in the radial direction by the flame generated in the combustion chamber 1240 does not reach the region of the inlet flow path 110 in which the fuel (F) and the air (A) are mixed because it is repeatedly reflected on an inner wall of the gradually narrowed flow path of the inclined flow path 120 and discharged (R2) back to the combustion chamber 1240 through the outlet flow path 130. Therefore, it is possible to prevent auto-ignition and flash-back phenomena caused by transfer of the radiant heat (R1) to the region in which the fuel (F) and the air (A) are mixed.

Meanwhile, according to the above-described exemplary embodiment, the fuel (F) is supplied through the supply port 112 in a state in which the air (A) is introduced into the micromixer 100 to generate the mixed fluid (FA), and in this case, because the low-speed fuel (F) is introduced in a state in which the air (A) flows at a relatively high speed, there is a problem that the fuel and the air are not sufficiently mixed.

Therefore, another exemplary embodiment suggests a method for improving mixing efficiency by supplying high-speed air (A) in a state in which a relatively low-speed fuel (F) flows into the micromixer.

Figure 6:
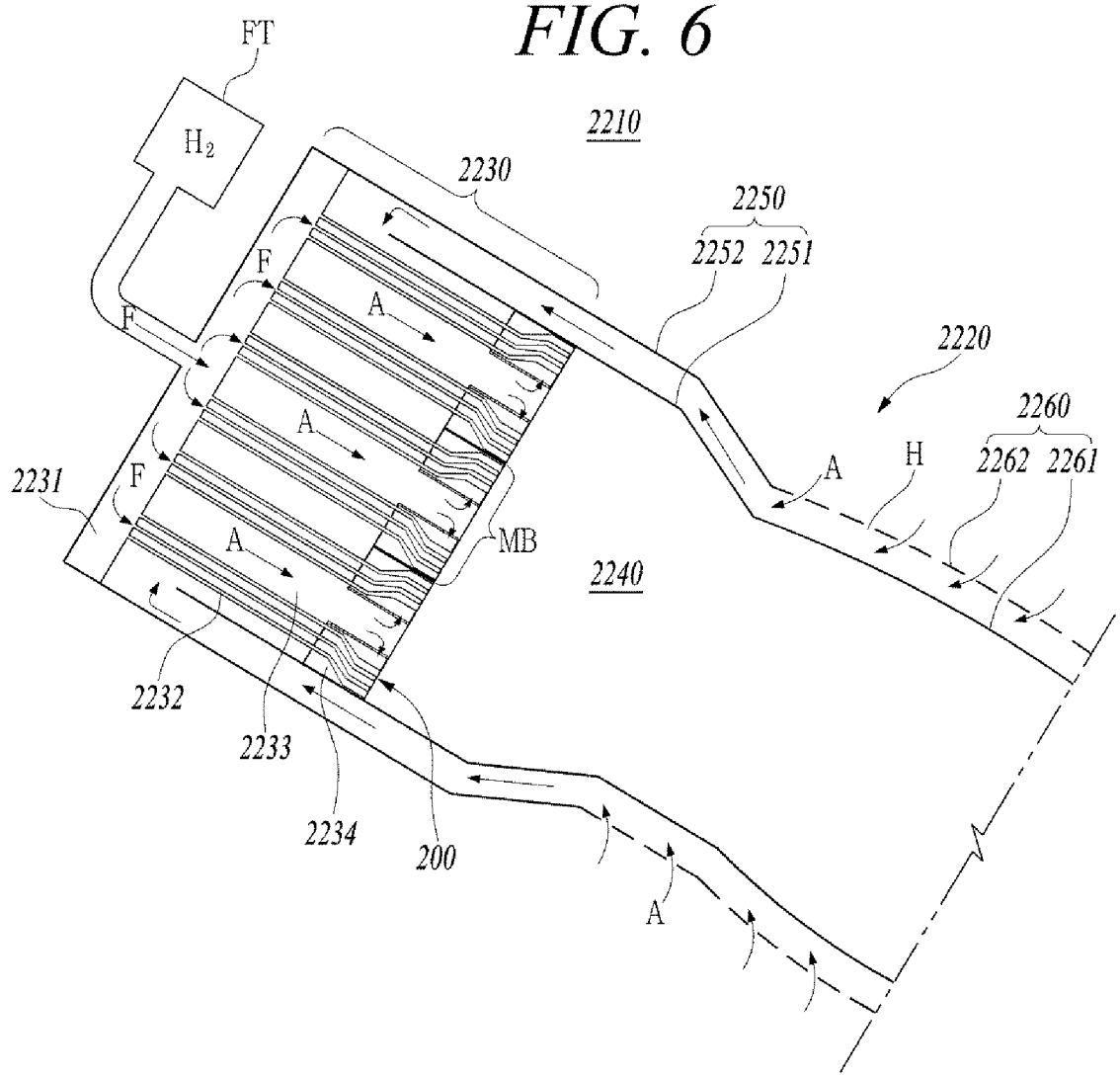
FIG. 6 is a diagram showing a burner module constituting the combustor according to another exemplary embodiment.
Figure 7:
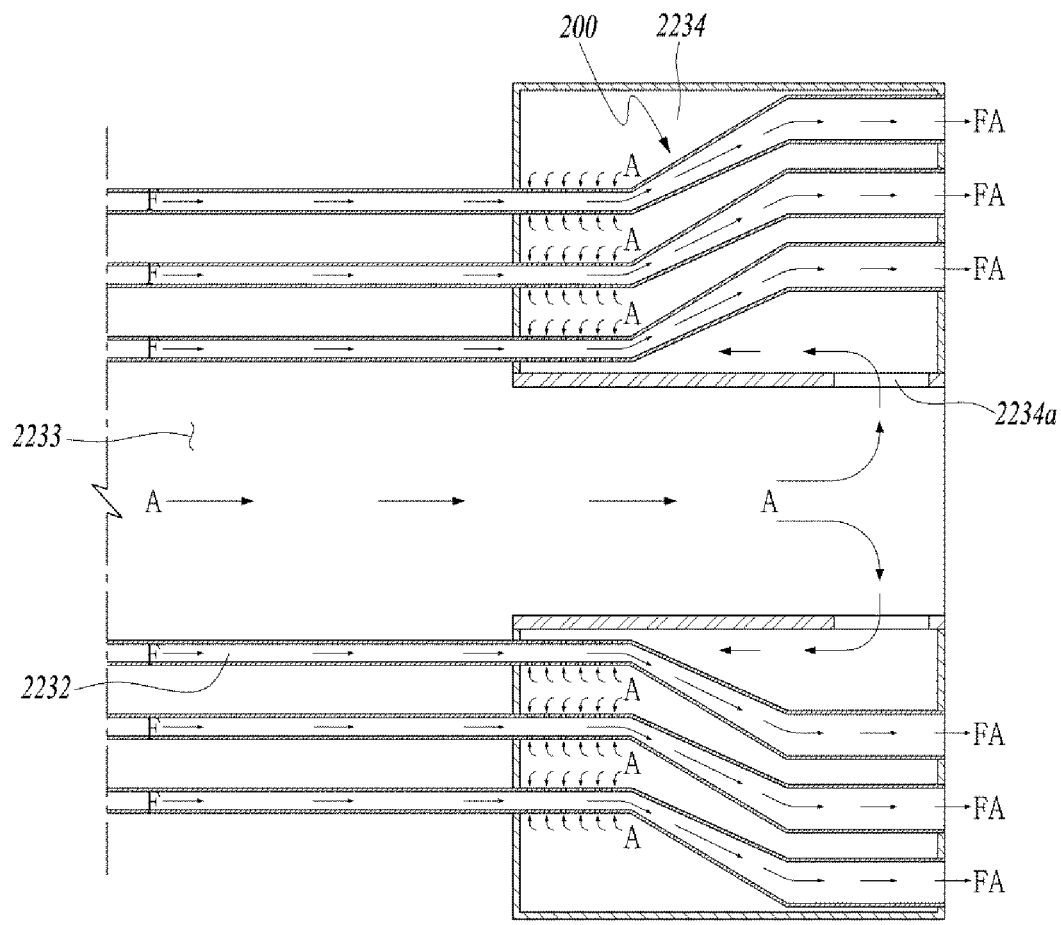
FIG. 7 is a side cross-sectional diagram showing a micromixer bundle according to another exemplary embodiment.
Figure 8:
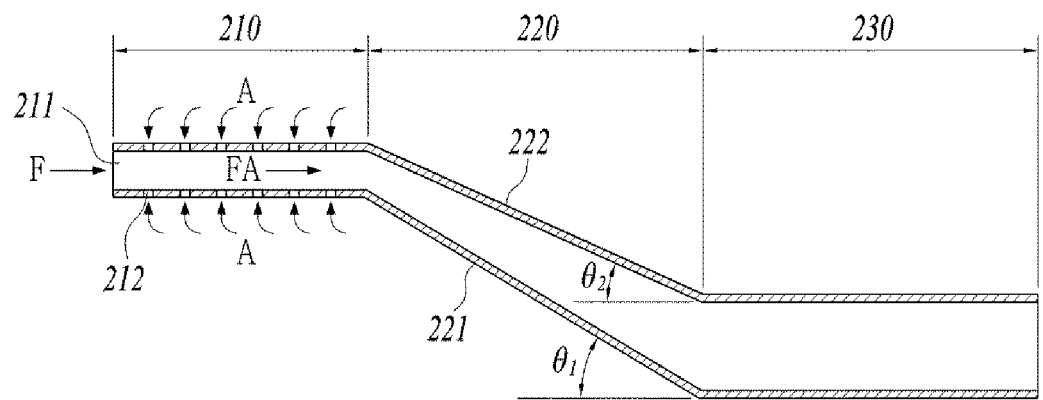
FIGS. 8 and 9 are side cross-sectional diagrams showing a micromixer according to another exemplary embodiment.
Figure 9:
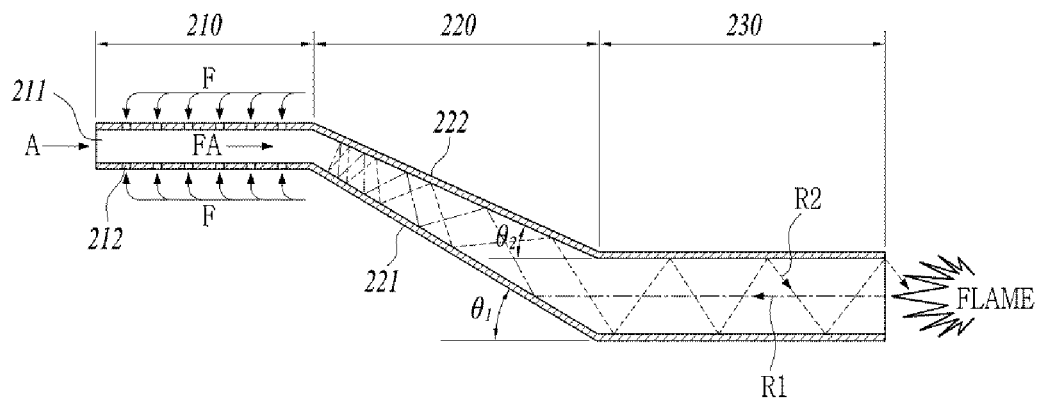

FIG. 6 is a diagram showing a burner module constituting the combustor according to another exemplary embodiment, FIG. 7 is a side cross-sectional diagram showing a micromixer bundle according to another exemplary embodiment, and FIGS. 8 and 9 are side cross-sectional diagrams showing a micromixer according to another exemplary embodiment.

Referring to FIGS. 6 and 7, the air (A) can be mixed in a state in which the fuel (F) flows into a micromixer 200 of a burner module 2210. The fuel (F) supplied from the fuel tank (FT) flows into the micromixer 200 through an end cover 2231 and a fuel flow path 2232.

The compressed air (A) is introduced into an annular space in a liner 2250 or a transition piece 2260 through the compressed air introduction hole (H), and a flow direction thereof can be changed by the end cover 2231 to flow along an air flow space 2233, then flows into an air plenum 2234 through a plenum inlet 2234a, and then flows into the micromixer 200 through a supply port 212 to be mixed with the fuel (F). Reference numeral 2220 not described refers to a combustion chamber assembly, and reference numeral 2230 refers to a micromixer assembly.

Referring to FIGS. 7 to 9, the micromixer bundle (MB) includes a plurality of micromixers 200 and is formed to extend in a radial direction with respect to a virtual center axis of the air flow space 2233. The micromixer 200 is formed to extend in the flow direction of the fluid (e.g., fuel or air).

The micromixer 200 is formed in a form of a tube in which a cross-sectional area thereof is gradually increased as a central portion is inclined as opposed to a general straight tube form, to reduce the transfer of radiant heat by the flame generated in the combustion chamber 2240 to the micromixer 200, thereby preventing auto-ignition and flash-back phenomena occurring in the micromixer 200.

The micromixer 200 includes an inlet flow path 210, an inclined flow path 220, and an outlet flow path 230.

The inlet flow path 210 connected to the fuel flow path 2232 includes an inlet 211 formed on one end to flow the fuel (F) and a supply port 212 formed on an inner wall to supply the air (A). The fuel (F) introduced through the inlet 211 and the air (A) supplied through the supply port 212 are mixed in the inlet flow path 210 to form the mixed fluid (FA) to flow into the inclined flow path 220.

The inclined flow path 220 connected to the other end of the inlet flow path 210 is inclined at a predetermined angle. The mixed fluid (FA) flows along the inclined flow path 220 and the outlet flow path 230, and then is injected into the combustion chamber 2240.

The outlet flow path 230 is formed at a position spaced apart from a virtual extension line of the inlet flow path 210. In other words, a flow axis (X1, center of the flow direction of the mixed fluid) of the mixed fluid (FA) flowing through the inlet flow path 210 and a flow axis (X2) of the mixed fluid (FA) flowing through the outlet flow path 230 do not coincide with each other by the inclined flow path 220 and are spaced apart from each other in a predetermined distance and arranged in parallel. The virtual extension line can be the flow axis of the mixed fluid (FA).

The inclined flow path 220 connects the inlet flow path 210 and the outlet flow path 230 and is inclined at a predetermined angle. The inclined flow path 220 connects the inlet flow path 210 and the outlet flow path 230 spaced apart from each other by a predetermined distance and is formed in a form of a tube in which the cross-sectional area is gradually increased from the inlet flow path 210 toward the outlet flow path 230.

As a result, the cross-sectional area of the inlet flow path 210 can be formed to be the smallest, and the cross-sectional area of the outlet flow path 230 can be formed to be the largest. In other words, the inlet flow path 210 can have a first cross-sectional area, the outlet flow path 230 can have a second cross-sectional area larger than the first cross-sectional area, and the inclined flow path 220 can have a variable cross-sectional area that is gradually increased from the inlet flow path 210 toward the outlet flow path 230.

Further, the inclined flow path 220 includes a first line 221 at a lower portion and a second line 222 at an upper portion. The first line 221 forms a first angle (θ1) with the virtual extension line (X2) of the outlet flow path 230, and the second line 222 forms a second angle (θ2) with the virtual extension line (X2) of the outlet flow path 230. Because the inclined flow path 220 has the variable cross-sectional area, the first angle (θ1) and the second angle (θ2) can be formed at different angles.

As shown in FIG. 8, if the inclined flow path 220 is formed to be inclined downward, the first angle (θ1) can be formed to be larger than the second angle (θ2). Alternatively, as in the micromixer 200 formed in the upper air plenum 2234 of FIG. 7, if the inclined flow path 220 is formed to be inclined upward, the second angle (θ2) can be formed to be larger than the first angle (θ1).

The cross-sectional areas of the inlet flow path 210, the inclined flow path 220, and the outlet flow path 230 can be formed in a polygonal shape.

Referring to FIG. 9, radiant heat (R1) transferred to the micromixer 200 through the outlet flow path 230 among the radiant heat in the radial direction by the flame generated in the combustion chamber 2240 does not reach the region of the inlet flow path 210 in which the fuel (F) and the air (A) are mixed because it is repeatedly reflected on an inner wall of the gradually narrowed flow path of the inclined flow path 220 and discharged (R2) back to the combustion chamber 2240 through the outlet flow path 230. Therefore, it is possible to prevent auto-ignition and flash-back phenomena caused by transfer of the radiant heat (R1) to the region in which the fuel (F) and the air (A) are mixed.

Further, the high-speed air (A) can be supplied in a state in which the relatively low-speed fuel (F) flows into the micromixer, thereby improving mixing efficiency.

Figure 10:
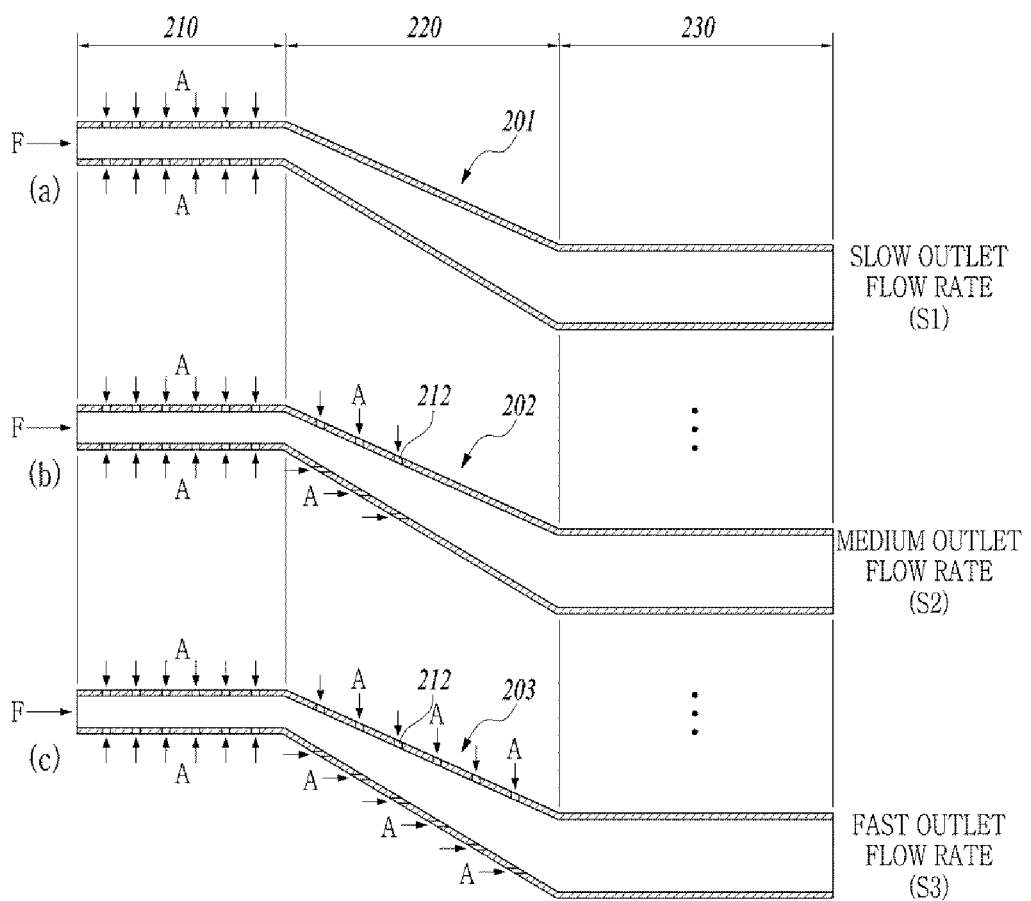
FIG. 10 is a side cross-sectional diagram showing various modified examples of a micromixer according to another exemplary embodiment.

FIG. 10 is a side cross-sectional diagram showing various modified examples of a micromixer according to another exemplary embodiment.

For example, if the combustion speed is higher than the speed of the mixed fluid (FA), the flame can backflow, thereby causing the flash-back phenomenon. According to the exemplary embodiments, because the cross-sectional area of the inlet flow path 210 is formed to be the smallest and the cross-sectional area of the outlet flow path 230 is formed to be the largest, a flow rate of the mixed fluid (FA) is the highest in the inlet flow path 210, and the flow rate gradually decreases as the mixed fluid (FA) flows through the inclined flow path 220 and the outlet flow path 230 according to the continuity equation. Therefore, the combustion speed can be higher than the speed of the mixed fluid (FA), thereby causing the flash-back phenomenon.

Referring to FIG. 10, the micromixers 201, 202 and 203 may include the supply port 212 through which the air is supplied and additionally formed in at least a part of the inclined flow path 220.

Because the air (A) that is relatively faster than the speed of the mixed fluid (FA) is joined through the additionally formed supply port 212, an additional speed can be applied to the mixed fluid (FA) whose speed decreases due to the expansion of the flow cross-sectional area, thereby preventing the flash-back phenomenon caused by slowing down of the mixed fluid (FA).

Meanwhile, if the air (A) supplied through the supply port 212 and the mixed fluid (FA) flowing through the inclined flow path 220 are mixed in the region of the inclined flow path 220, an equivalent ratio is lower than that of the air (A) and the fuel (F) being mixed in the inlet flow path 210, so that even if a part of the radiant heat (R1) is delivered to the region of the inclined flow path 220, it is possible to reduce auto-ignition and flash-back phenomena due to the transfer of the radiant heat (R1).

While one or more exemplary embodiments have been described with reference to the accompanying drawings, it will be apparent to those skilled in the art that various modifications and variations can be made through addition, change, deletion, or substitution of components without departing from the spirit and scope of the disclosure described in the appended claims, and these modifications and changes fall within the spirit and scope of the disclosure as defined in the appended claims.

What is claimed is:
1. A micromixer comprising:
a fuel flow path centered and extending along a longitudinal axis;
an inlet flow path having a first axis spaced apart from, and parallel to, the longitudinal axis,
the inlet flow path including an inlet and a supply port,
the inlet formed on an upstream end of the micromixer and receiving a first fluid, and the supply port formed on an inner wall of the inlet flow path and receiving a second fluid supplied from the fuel flow path, the second fluid being a fuel, and
the inlet flow path configured to flow a mixed fluid formed by mixing the first fluid introduced through the inlet and the second fluid supplied through the supply port;
an outlet flow path having a second axis spaced apart from, and parallel to, the longitudinal axis and configured to inject the mixed fluid into a combustion chamber at a downstream end of the micromixer; and
an inclined flow path connecting the inlet flow path and the outlet flow path, the inclined flow path inclined from the inlet flow path toward a radial direction relative to the longitudinal axis,
wherein the inclined flow path's side cross-section includes a first straight line connecting the inlet flow path and the outlet flow path, and a second straight line connecting the inlet flow path and the outlet flow path, wherein the second straight line is disposed radially inward from the first straight line relative to the longitudinal axis, the first straight line being inclined from the inlet flow path toward the radial direction at a first angle relative to the longitudinal axis and the second straight line being inclined from the inlet flow path toward the same radial direction at a second angle relative to the longitudinal axis, and the second angle is smaller than the first angle, thereby reducing transfer of radiant heat of flame generated in the combustion chamber to the inlet flow path, wherein the second axis of the outlet flow path is disposed parallel to, and spaced radially outward from the first axis of the inlet flow path, wherein both of the inlet flow path and the outlet flow path are formed to be straight and parallel to the longitudinal axis.

2. The micromixer of claim 1, wherein the first fluid is air and the second fluid, which is the fuel, comprises hydrogen.

3. A combustor comprising:
a combustion chamber assembly comprising a combustion chamber in which a mixed fluid is combusted;
a micromixer assembly comprising: a fuel flow path centered and extending along a longitudinal axis, and a plurality of micromixers to inject the mixed fluid into the combustion chamber at a downstream end of the micromixer assembly, wherein each of the plurality of micromixers comprises:
an inlet flow path having a first axis spaced apart, and parallel to, the longitudinal axis, the inlet flow path including an inlet and a supply port, the inlet formed on an upstream end of the micromixer assembly and receiving a first fluid, and the supply port formed on an inner wall of the inlet flow path and receiving a second fluid supplied from the fuel flow path, the second fluid being a fuel, and the inlet flow path configured to flow the mixed fluid formed by mixing the first fluid introduced through the inlet and the second fluid supplied through the supply port;
an outlet flow path having a second axis spaced apart from, and parallel to, the longitudinal axis and configured to inject the mixed fluid into the combustion chamber at the downstream end of the micromixer assembly; and
an inclined flow path connecting the inlet flow path and the outlet flow path, the inclined flow path inclined from the inlet flow path toward a radial direction relative to the longitudinal axis,
wherein the inclined flow path's side cross-section includes a first straight line connecting the inlet flow path and the outlet flow path, and a second straight line connecting the inlet flow path and the outlet flow path, wherein the second straight line is disposed radially inward from the first straight line relative to the longitudinal axis,
the first straight line being inclined from the inlet flow path toward the radial direction at a first angle relative to the longitudinal axis and the second straight line being inclined from the inlet flow path toward the same radial direction at a second angle relative to the longitudinal axis, and the second angle is smaller than the first angle, thereby reducing transfer of radiant heat of flame generated in the combustion chamber to the inlet flow path, wherein, for each of the plurality of micromixers, the second axis of the outlet flow path is disposed parallel to, and spaced radially outward from the first axis of the inlet flow path, wherein, for each of the plurality of micromixers, both of the inlet flow path and the outlet flow path are formed to be straight and parallel to the longitudinal axis.

4. The combustor of claim 3, wherein the first fluid is air and the second fluid, which is the fuel, comprises hydrogen.

5. A gas turbine comprising:
a compressor configured to compress air;
a combustor configured to produce a combustion gas; and
a turbine configured to be rotated by the combustion gas produced by the combustor to generate power, wherein the combustor comprises:
a combustion chamber assembly comprising a combustion chamber in which a mixed fluid is combusted; and
a micromixer assembly comprising: a fuel flow path centered and extending along a longitudinal axis, and a plurality of micromixers to inject the mixed fluid to the combustion chamber at a downstream end of the micromixer assembly, and wherein each of the plurality of micromixers comprises:
an inlet flow path having a first axis spaced apart, and parallel to, the longitudinal axis, the inlet flow path including an inlet and a supply port, the inlet formed on an upstream end of the micromixer assembly and receiving a first fluid, and the supply port formed on an inner wall of the inlet flow path and receiving a second fluid supplied from the fuel flow path, the second fluid being a fuel, and the inlet flow path configured to flow the mixed fluid formed by mixing the first fluid introduced through the inlet and the second fluid supplied through the supply port;
an outlet flow path having a second axis spaced apart from, and parallel to, the longitudinal axis and configured to inject the mixed fluid to the combustion chamber at the downstream end of the micromixer assembly; and
an inclined flow path connecting the inlet flow path and the outlet flow path, the inclined flow path and inclined from the inlet flow path toward a radial direction relative to the longitudinal axis,
wherein the inclined flow path's side cross-section includes a first straight line connecting the inlet flow path and the outlet flow path, and a second straight line connecting the inlet flow path and the outlet flow path, wherein the second straight line is disposed radially inward from the first straight line relative to the longitudinal axis;
the first straight line being inclined from the inlet flow path toward the radial direction at a first angle relative to the longitudinal axis and the second straight line being inclined from the inlet flow path toward the same radial direction at a second angle relative to the longitudinal axis, and the second angle is smaller than the first angle, thereby reducing transfer of radiant heat of flame generated in the combustion chamber to the inlet flow path, wherein, for each of the plurality of micromixers, the second axis of the outlet flow path is disposed parallel to, and spaced radially outward from the first axis of the inlet flow path, wherein, for each of the plurality of micromixers, both of the inlet flow path and the outlet flow path are formed to be straight and parallel to the longitudinal axis.

6. The gas turbine of claim 5, wherein the first fluid is air and the second fluid, which is the fuel, comprises hydrogen.

* * * * *